Sept. 6, 1960 G. H. MOREY 2,952,001
ELECTRICAL HEATING TAPE AND METHOD OF MAKING
Filed Aug. 4, 1958 3 Sheets-Sheet 1
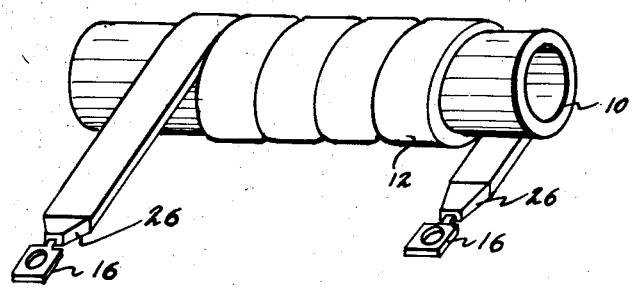
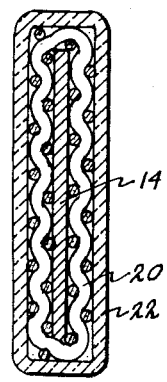
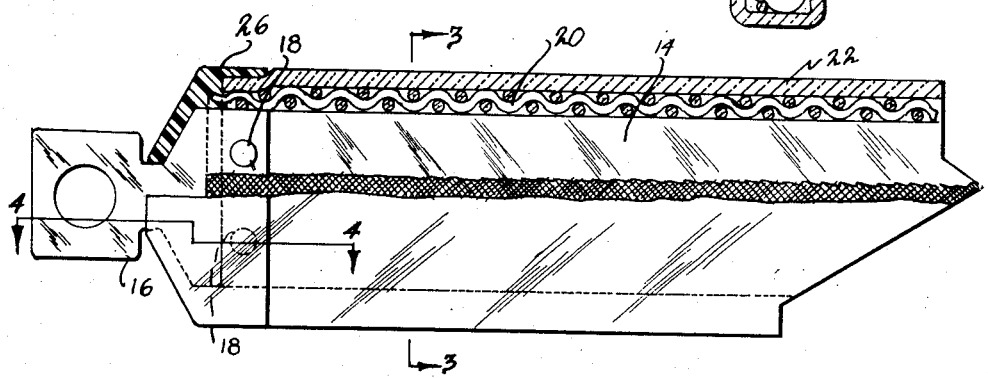
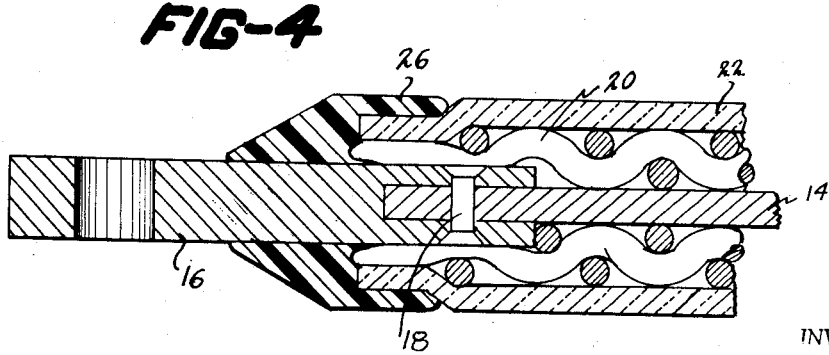
INVENTOR.
GLEN H. MOREY
BY Toulmin & Toulmin
ATTORNEYS Sept. 6, 1960 G. H. MOREY 2,952,001
ELECTRICAL HEATING TAPE AND METHOD OF MAKING
Filed Aug. 4, 1958 3 Sheets-Sheet 2

INVENTOR.
GLEN H. MOREY
BY
ATTORNEYS

Sept. 6, 1960    G. H. MOREY    2,952,001
ELECTRICAL HEATING TAPE AND METHOD OF MAKING
Filed Aug. 4, 1958    3 Sheets-Sheet 3
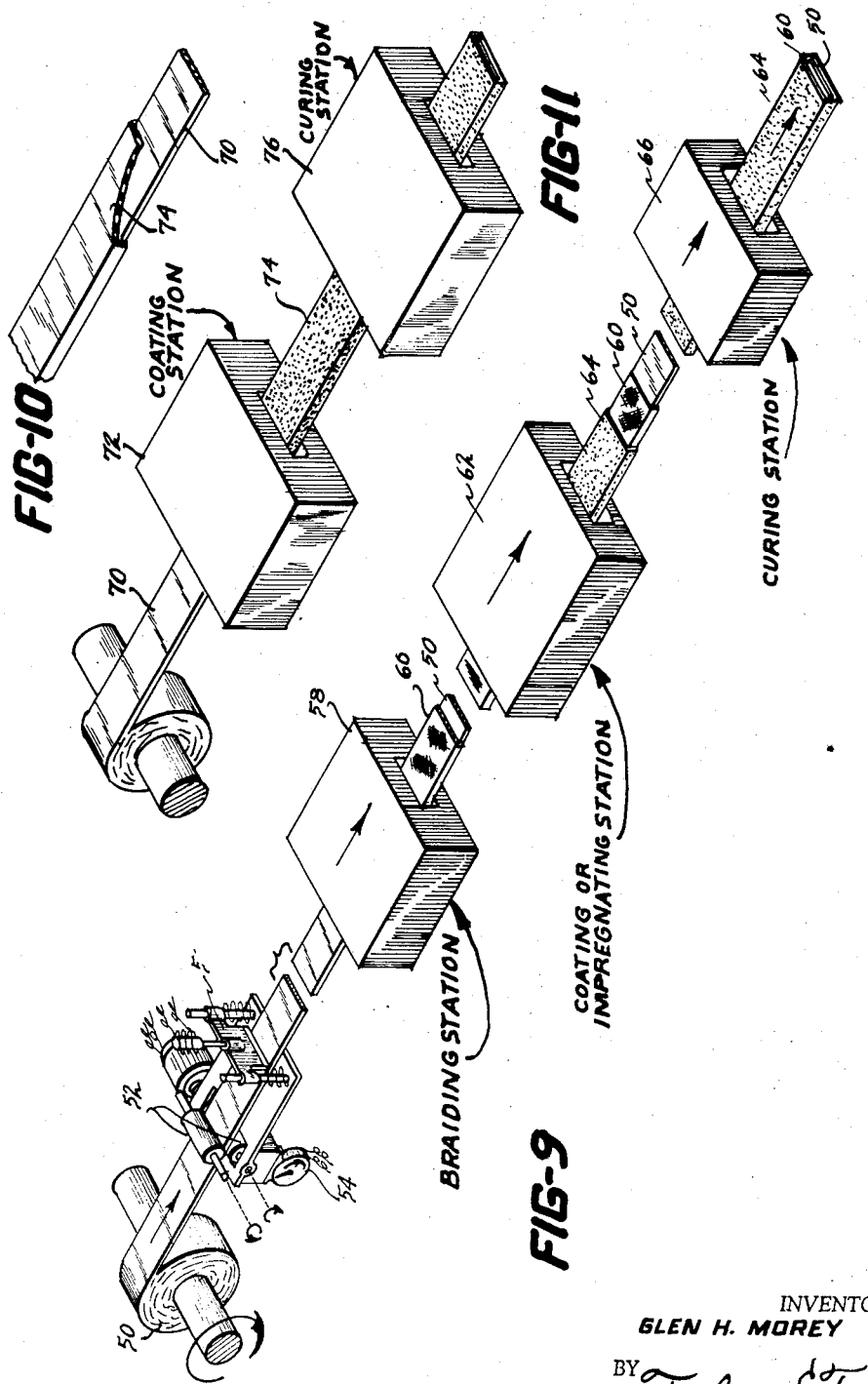
INVENTOR.
GLEN H. MOREY
BY
ATTORNEYS

United States Patent Office 2,952,001
Patented Sept. 6, 1960

2,952,001

ELECTRICAL HEATING TAPE AND METHOD OF MAKING

Glen H. Morey, Terre Haute, Ind., assignor to Linton-Summit Coal Company Inc., Terre Haute, Ind., a corporation of Indiana Filed Aug. 4, 1958, Ser. No. 752,812

5 Claims. (Cl. 338—210)

This invention relates to electric heating tapes and in particular to elongated flexible electric heating tapes and to a method of manufacture thereof.

Electric heating tapes or strip heaters are well known and heretofore have consisted principally of heating elements in the form of wires. To form a wide ribbon-like tape these wires have been laid in a generally transverse zig-zag pattern in a tape, or could be run from end to end of the tape a plurality of times.

The particular difficulty of such an arrangement is that the fine wire employed is of a high resistance and thus only short tapes can be made if sufficient watts per square inch are developed to give such a tape general utility.

Also, the use of such fine wire naturally makes the heating element fragile and it will readily burn out and can be subjected to very little abuse and the fine wire also tends to produce an uneven heating pattern.

Having the foregoing in mind it is a primary object of the present invention to provide an electric heating tape that overcomes the drawbacks referred to above that have characterized heating tapes heretofore known.

A particular object of the present invention is to provide an electric heating tape that is substantially uniform with regard to its heat developing characteristics as measured in watts per square inch of tape.

It is also an object of this invention to provide an electric heating tape which can be made in substantially any length without any loss of efficiency or uniformity of heat developing characteristics.

It is also an object of this invention to provide an electric heating tape that is extremely rugged and will withstand considerable abuse and which will not tend to burn out as is the case with heating tapes having fine resistant wire therein.

A still further object of this invention is the provision of a new method of constructing heating tapes which leads to a tape of improved characteristics but which is nevertheless economical to manufacture.

A still further object of the present invention is the provision of an electric heating tape of the nature referred to which can be utilized in locations where there are moisture contents without any danger of the tape shorting out or creating any hazard by grounding against a pipe or the like about which it is wrapped or otherwise associated.

These and other objects and advantages will become more apparent upon reference to the drawings in which:

Figure 1 is a rather diagrammatic fragmentary view showing one manner in which an electric tape according to my invention can be applied to a pipe or the like;

Figure 2 is a view showing one end of the tape partly in section illustrating the connection of a terminal to the heating element of the tape and the sleeve surrounding the tape;

Figure 3 is a transverse section indicated by line 3—3 on Figure 2 showing the configuration of the heating element;

Figure 4 is a sectional view indicated by line 4—4 on Figure 2 showing the connection of the terminal to the heating element in cross section;

Figure 9 is a perspective view showing more or less diagrammatically an arrangement for automatically and continuously producing heating elements according to this invention either as continuous or multiple lengths;

Figure 10 is a perspective view representing a ribbon-like heating element having a single coating of high temperature plastic material thereon;

Figure 11 is a perspective view similar to Figure 9 showing how the modification of Figure 10 could be produced.

Figure 6:
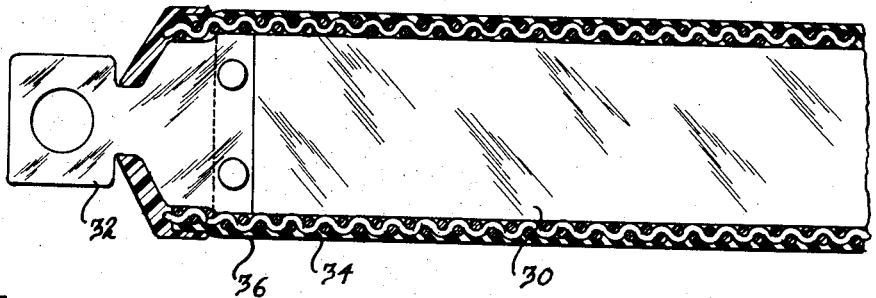
Figure 6 is a view similar to Figure 2 but showing a sheathing arrangement wherein the sheathing of the tape consists of a single layer of impregnated fabric.

Referring to the drawings somewhat more in detail, in Figure 1 there is a pipe or like member 10 and wrapped spirallingly about the pipe is an elongated heating tape 12 according to the present invention. This tape is energized and develops a certain amount of heat and this is useful in maintaining the pipe at a predetermined temperature, which may be necessary for certain chemical operations, or it may be necessary to thaw the pipe out if frozen or to prevent the pipe from freezing. This application of heating tapes is well known.

According to the present invention, however, the heating tape is constructed in a novel manner and features of the invention will be seen in Figures 2, 3 and 4.

In the first place the heating element portion of the tape is in the form of a ribbon 14 as opposed to the relatively fine wires that have heretofore been used in heating tapes of this nature. The forming of the heat element into the shape of a ribbon has a number of advantages in that it permits the tape to be made of a much greater length than has heretofore been possible and permits the tape to be readily adaptable to different voltages and provides for an extremely rugged tape that will withstand considerable abuse and which has little tendency to burn out which has been a particular fault in connection with tapes according to the prior art.

Furthermore, the use of ribbon as the heating element provides for substantially uniform generation of heat throughout the length and width of the tape so that the pipe or other work member with which the tape is associated is uniformly heated thereby avoiding hot spots which might prove troublesome and which in themselves might have a tendency to cause the tape to burn out and become damaged.

The ribbon 14 is provided with a terminal 16 at each end. This may be attached thereto by rivets 18. Any suitable sort of terminal may be provided by means of which the tape can be properly connected to a source of electrical energy.

It is necessary for the ribbon to be insulated and for this purpose I surround the ribbon with a wrapping or sleeve 20 which may be of high temperature glass or quartz fiber and which may be a wound, knitted, braided or woven strip wrapped about the ribbon or it may consist of a knitted, braided, or woven sleeve. Knitted or braided sleeving has the advantage that it will expand somewhat upon being compressed from end to end thereby permitting it to be easily pushed over the tape, or the tape drawn there-through and thereafter when the tubing is pulled out it will closely embrace the ribbon. In any case the covering 20 provides an electric insulating layer about the ribbon which is able to withstand the temperatures at which the heating tape will operate.

In certain cases it is only necessary to provide electrical insulation about the ribbon of the tape but in many other cases it is quite desirable for the heating tape to be provided with a water-proof outer coating thus permitting the tape to be used in connection with pipe and like members which might sweat and which might be located where moisture is present for other reasons.

Figure 5:
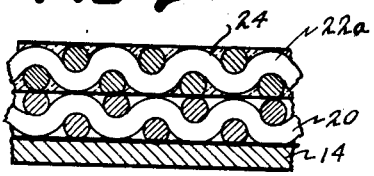
Figure 5 is a fragmentary view showing a modified type of sheath for the heating element of which the outer layer is an impregnated fabric.

In the tape of Figures 2, 3 and 4, this is accomplished by having on the outside of the electrical insulating layer 20 a layer of heat resistant material 22 which might comprise a silicone rubber or other plastic material resistant to the temperatures at which the tape would operate, say up to 500° F., and which material is furthermore flexible. This water-proofing material may take the form of an added sleeve of the water-proofing material as it is illustrated in Figures 2, 3 and 4 or it may be in the form of a plastic sleeve or tube either woven or knitted and so impregnated with the material as to render the outer sleeve water-proof. This is illustrated in Figure 5 wherein the outer sleeve 22a is completely impregnated with an impregnant 24 of the nature referred to above which is flexible water-proof and resistant to the temperatures encountered.

It is possible in many cases merely to terminate the covering or coverings of the ribbon adjacent the ends of the ribbon and to close the ends by a fabric wrapping stitched thereto, or it may be possible to mold about the ends of the covering or coverings and the ribbon heating element and terminal an end cap 26 which will serve to close the ends of the covering and to fix the covering in place on the ribbon thus making the entire unit convenient to manipulate and protecting against the coverings creeping along the ribbon heating element. The material of the molded cap 26 need not be flexible, although it can be a silicone type rubber, and is of such a nature to withstand the temperatures encountered in using the tape and is resistant to breakage and abrasion.

Figure 6 shows a manner in which the ribbon heating element 30 having a terminal 32 can be inclosed within a single sleeve 34 and which sleeve is impregnated with flexible heat resistant water-proof electrical insulating material 36 such as a silicone rubber or the like.

The sleeve in the Figure 6 modification may consist of a braided, knitted or woven tube impregnated as described or it may consist of a woven or knitted tube to the outside of which is bonded a high temperature plastic material. Such tubing would preferably be flattened at the time of manufacture to facilitate the placing therein of the ribbon like metallic heating element.

It has also been found that the glass or quartz sleeve could be formed directly about the metallic ribbon-like heating element according to practices known in the art of weaving, knitting or braiding coatings on wires or like members. In this case the length limitations of the heating tape that might be present where the tape was introduced into an already formed tubing would not be present and the tape could be made in continuous lengths of several hundred feet quite readily and in ribbon widths to say 3 inches. In this case the coating or impregnating of the sleeving would be accomplished either simultaneously with the operation of placing the sleeving about the ribbon or in a subsequent operation, either method of impregnating or coating being quite satisfactory. The possibility presents itself in this case of utilizing the heating element itself for carrying out any necessary curing operations of the coating or impregnant thus eliminating the need for curing ovens and the like and the difficulties of curing extremely long heating tapes.

Figure 7:
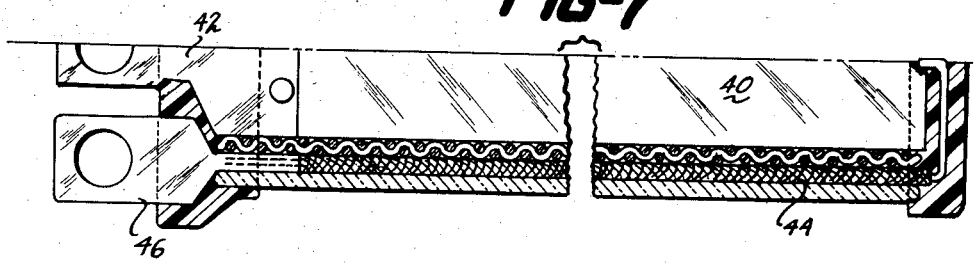
Figure 7 is a view showing a heating tape in which there is a return wire within the tape so that both connections to the heating element of the tape can be made at one end thereof.
Figure 8:
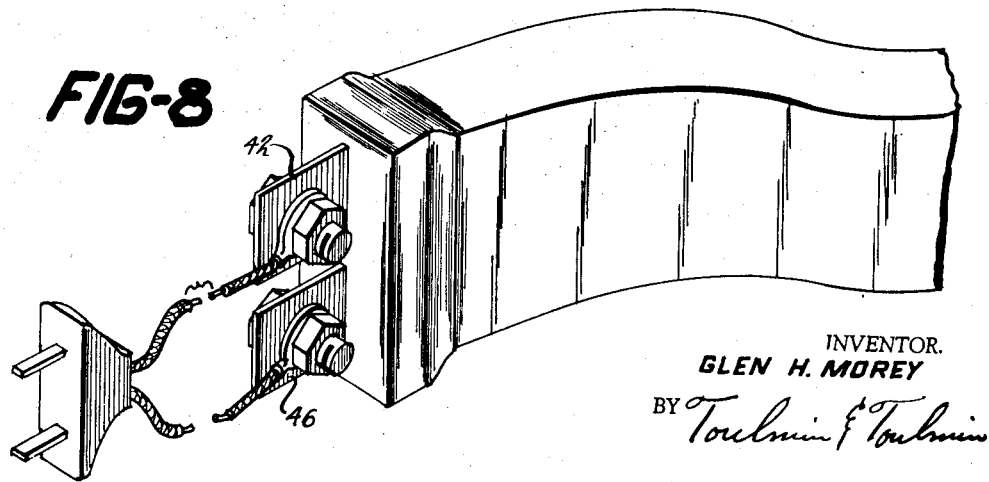
Figure 8 is a perspective view of the tape of Figure 7.

In some cases it might be desired for both connections to the heating element to be located at one end of the tape and such an arrangement is illustrated diagrammatically in Figures 7 and 8. In these figures the heating element 40 is provided with one terminal 42 at one end and at the opposite end of the tape there is located a return wire 44 that returns within the sleeving, or in a special compartment pertaining to the sleeving to the same end as the terminal 42 and has attached thereto a terminal 46. In the Figures 7 and 8 arrangement it becomes quite simple to fit the heating tape with an extension that carries a plug so that the tape can be plugged into a source of electrical energy quite readily.

Figure 9 illustrates diagrammatically an arrangement for automatically producing the covered heating tape in continuous lengths. In this figure the resistance heating ribbon 50 is supplied from a reel from which it is drawn through a pair of feed rollers 52. These feed rollers may be provided with an indicating measuring device 54 which may be utilized for automatically controlling the cut-off knife 56 which is operable for cutting off the strip to the desired lengths. Alternatively, the strip may be cut off to the desired lengths after the sleeving has been applied.

After the strip passes the cut-off station, it passes through a braiding station 58 where the textile covering 60 is applied to the ribbon in the form of a braided covering or the like. The now covered ribbon like heating element then passes through a coating or impregnating station 62 where it is provided with a waterproof coating as referred to previously.

This coating may be done by spray means or by dipping or the coating may be applied by brushes or any other desired manner.

This coating 64 may then be cured by passing the ribbon through a curing station 66 and which will consist of some means for applying heat to the coating so that it permanently sets up. In the foregoing manner the ribbon-like heating element can be continuously processed with the end product being cut into the desired length whereupon terminals can be fitted the ends of the ribbon and the article will then be ready for use.

In certain instances it is possible to eliminate the braided covering. This may be the case where the heating element is not subjected to a great deal of abrasion or where the temperature at which the heating element operates is relatively low. In a case like this the ribbon-like heating element 70 can be supplied from a reel and passed directly through a coating station 72 where a coating 74 is applied and which coating is then cured in curing station 76. In most cases the braided covering will be desired but, as explained above, it is within the scope of the present invention to cover the ribbon-like heating element solely with the coating material if so desired.

The heating element of Figure 10 illustrates the manner in which a coating could be applied directly to the heating element and Figure 11 illustrates diagrammatically the apparatus for accomplishing the coating of the heating element.

The coating in the modification of Figure 10 could comprise a high temperature plastic material such as a silicone rubber and such material in itself would form an adequate sheathing to the heating element in circumstances where the temperature of the heating element remains relatively low, below 500° F., or the coating material could have added thereto particles or strands of high temperature glass, quartz, asbestos or a synthetic material such as is known as Fiberfrax and which additive would have the effect of increasing the abrasion and tearing resistance of the sheathing while not detracting in any way from the water proof characteristics thereof.

Figure 12:
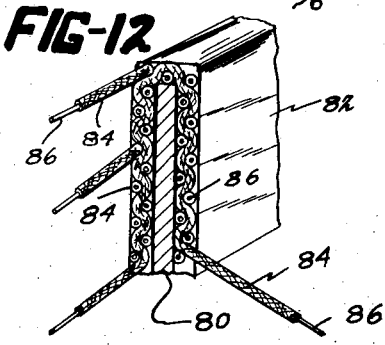
Figure 12 is a fragmentary view showing a ribbon-like heating element provided with a sheath of wire reinforced textile material.

The Figure 12 modification illustrates an arrangement wherein the ribbon-like heating element 80 is provided with a textile sheathing 82 which is of a special nature in that the individual threads are yarns 84 of which the sheathing is made up or individually reinforced by wires 86.

These wires are quite small, usually only being a few thousandths thick so that they are highly flexible and are resistant to corrosion and high temperature. Stainless steel, Iconel, Nichrome or Kanthal, for example, are all suitable materials for the wire 86.

As to the fibrous portion of the threads or yarns, a high temperature fiber such as asbestos, quartz, or Fiberfrax can be employed. The advantage of the wires 86, when provided in the yarns, is that the heating element can be operated at very high temperatures, well over 1000° F., and even up to 2000° F. and higher, and the fibrous sheathing will not disintegrate. Most of the high temperature fibers employed have a tendency to crumble at extremely high temperatures and if they are not reinforced, the insulation about heating element deteriorates. It has been found, however, that the wires bind the insulating fibers together so that they do not crumble or fall away from their position and thus the sheathing is substantially bound to the heating element. At the same time the sheathing provides adequate insulation around the wires 86 so that they do not contact the heating element which would, of course, be hazardous and might generate sparks or detract from the uniform characteristics of the heating element.

The Figure 12 arrangement would generally be employed with only the wire reinforced sheathing about the heating element, but it is also possible to employ this sheathing in combination with any of the other sheathings illustrated and described. It would not, ordinarily, be the case that the wire reinforced sheathing would be employed with plastic materials known today to obtain a waterproof arrangement because the temperature limitations of the plastic material make it unnecessary to provide the wire reinforced sheath. A contemplated arrangement, however, would be the provision of an insulating sheath of textile material about the heating element with the wire reinforced sheathing on the outside in which case the wire reinforced sheathing would provide support for both layers of insulation.

In all of the modifications described above the advantages obtain in that an extremely strong, rugged heating tape is provided characterized in developing heat substantially uniformly over the entire surface, in being waterproof and being capable of being made in long lengths and wide widths all in a simple and direct manner as opposed to the difficulties that would be encountered in constructing similar heating tapes of relatively fine heating wires such as heretofore has been done.

It will be understood that this invention is susceptible to modification in order to adapt it to different usages and conditions; and, accordingly, it is desired to comprehend such modifications within this invention as may fall within the scope of the appended claims.

I claim:

1. As a new article of manufacture; an elongated flexible resistance heating tape consisting of an elongated ribbon-like flexible resistance heating element having terminals on its opposite ends, and a flexible sheath of abrasion resistant waterproof electrical insulating material closely fitted about the said heating element and extending from end to end thereof, said sheath comprising textile material and a high temperature resistant plastic material thereon presenting a continuous uninterrupted surface to the outside of the tape.

2. As a new article of manufacture; an elongated flexible resistance heating tape consisting of an elongated flexible ribbon-like resistance heating element having terminals on its opposite ends, and a flexible sheath of abrasion resistance waterproof electrical insulating material on the said heating element extending from end to end thereof, said sheath comprising a fabric sleeve surrounding the element and high temperature resistant plastic material covering and impregnating the fabric sleeve.

3. As a new article of manufacture; an elongated flexible resistance heating tape consisting of an elongated flexible ribbon-like resistance heating element having terminals on its opposite ends, and a flexible sheath of abrasion resistance waterproof electrical insulating material on the said heating element extending from end to end thereof, said sheath comprising an inner fabric sleeve closely embracing the heating element, said sleeve being formed of temperature resistant electrical insulation material and an outer sleeve surrounding the inner sleeve and comprising a heat resistant textile material impregnated with a heat resistant plastic waterproof material.

4. A heating tape according to claim 1 which includes waterproof end caps of electrical insulating material on opposite ends of the tape sealingly engaging said plastic material and said terminals thereby completely to seal in the heating element.

5. As a new article of manufacture; an elongated flexible resistance heating tape consisting of an elongated ribbon-like flexible resistance heating element having a first terminal element rigidly attached thereto at one end, a flexible sheath of abrasion resistant waterproof electrical insulating material closely surrounding said heating element from end to end thereof comprising a sleeve of textile material and a high temperature resistant plastic material coating the textile material, a second terminal element adjacent said first terminal element, a wire leading from said second terminal element along the outside of the sleeve to the opposite end of the heating element, and end caps of electrical insulating material on the ends of the tape sealingly connecting said terminal elements to said plastic material and holding the terminal elements in spaced relation and sealing the end of the tape opposite said terminal elements.

References Cited in the file of this patent

UNITED STATES PATENTS

| | | |
|---|---|---|
| 1,007,441 | Hadaway | Oct. 31, 1911 |
| 1,614,331 | Wiegand | Jan. 11, 1927 |
| 2,341,219 | Jones | Feb. 8, 1944 |
| 2,386,095 | Edgar et al. | Oct. 2, 1945 |
| 2,584,302 | Stein | Feb. 5, 1952 |
| 2,610,286 | Cox | Sept. 9, 1952 |
| 2,811,132 | Ahlbin | Oct. 29, 1957 |
| 2,822,777 | Colchagoff | Feb. 11, 1958 |

FOREIGN PATENTS

| | | |
|---|---|---|
| 279,523 | Great Britain | Oct. 20, 1927 |